Sept. 16, 1941.    K. A. TAPKEN    2,256,061
VALVE TOOL
Filed Sept. 9, 1940    3 Sheets-Sheet 1
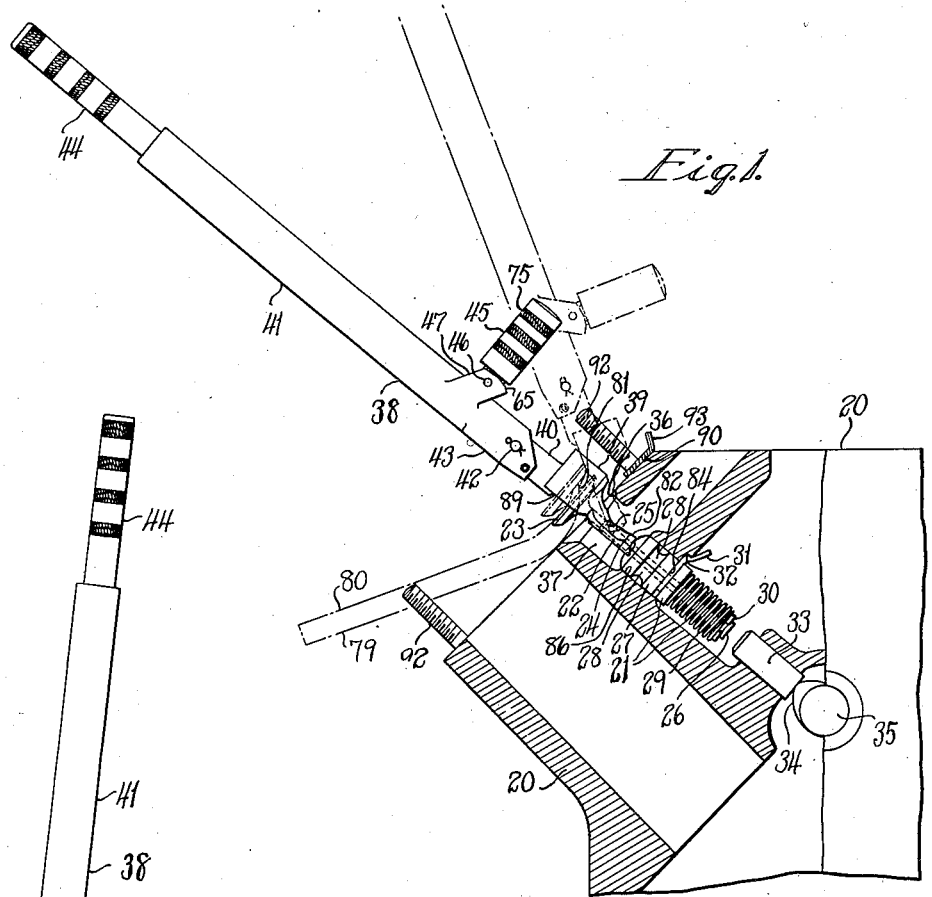
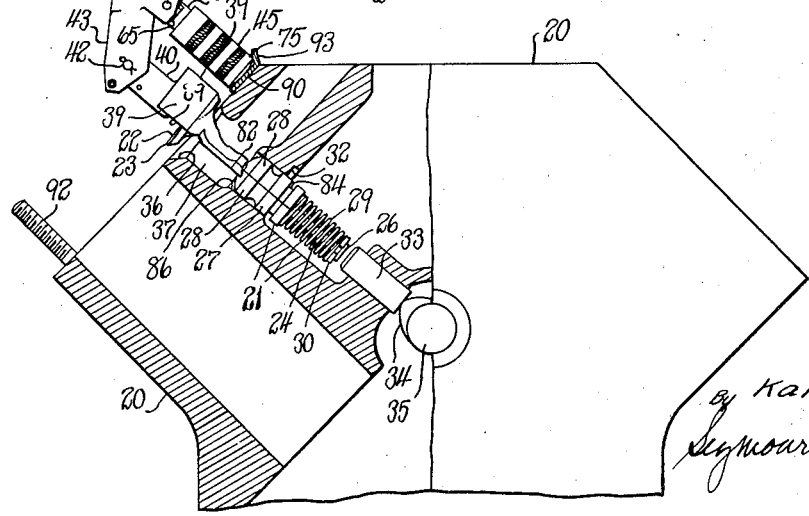
Inventor
Karl A. Tapken

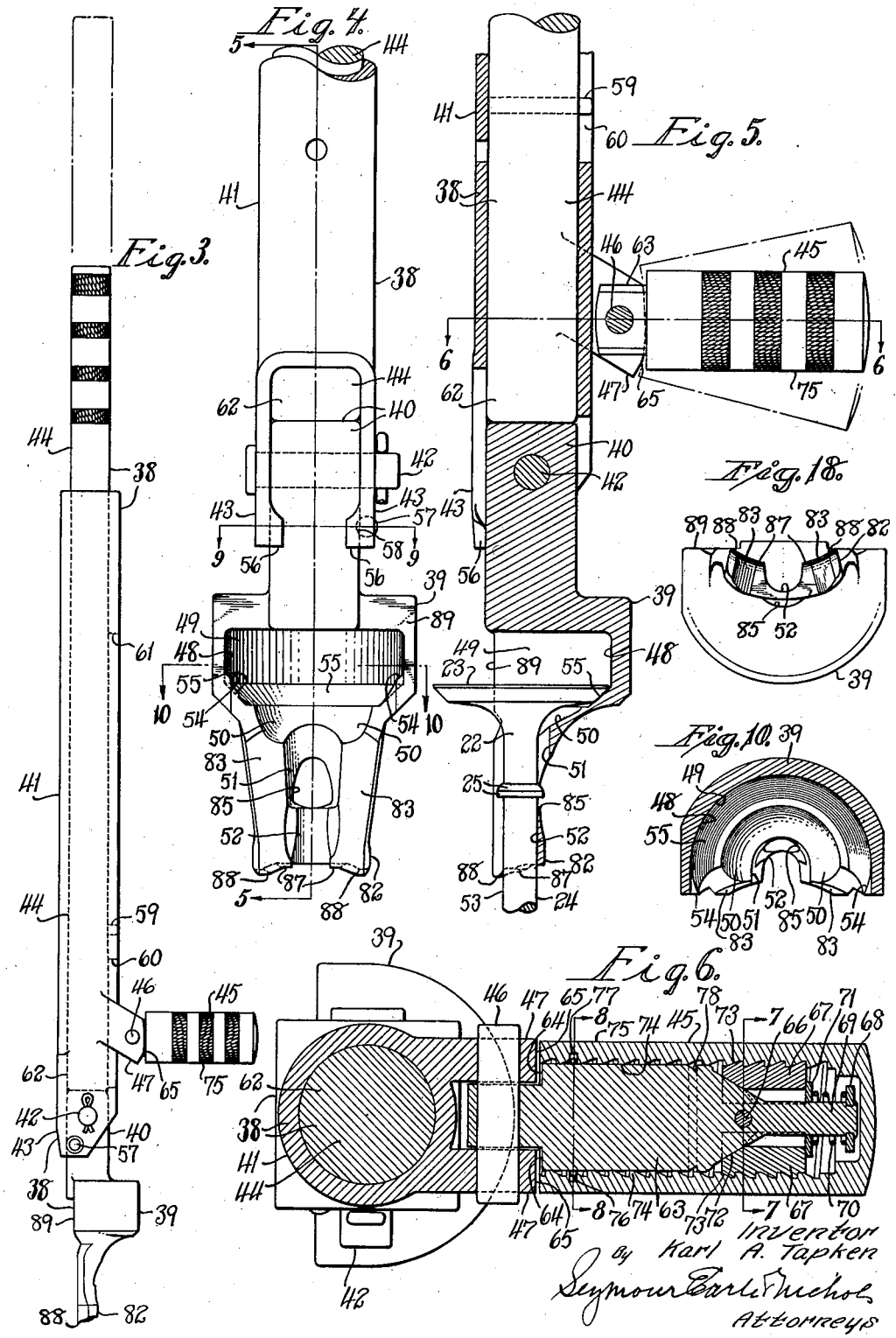

Sept. 16, 1941.  K. A. TAPKEN  2,256,061
VALVE TOOL
Filed Sept. 9, 1940  3 Sheets-Sheet 3
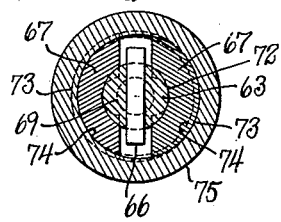
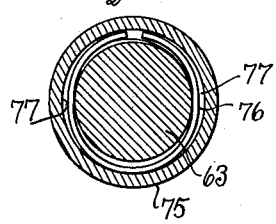
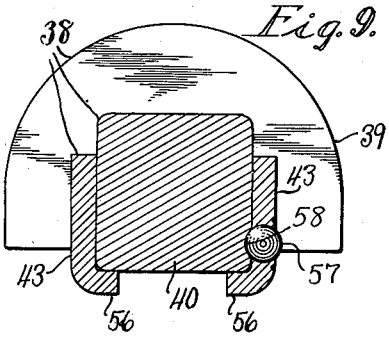
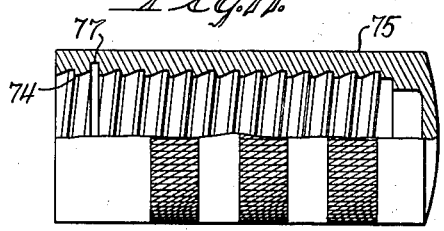
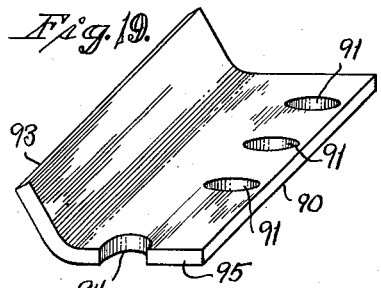
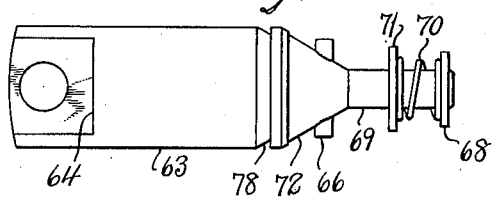
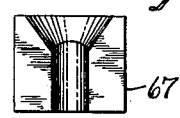
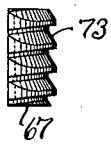
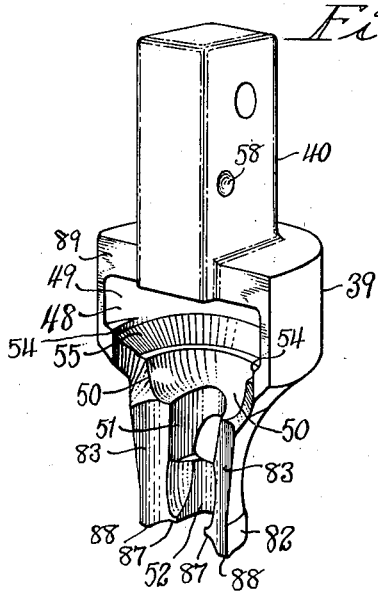
Inventor
By Karl A. Tapken
Seymour Earle Nichols
Attorneys Patented Sept. 16, 1941

2,256,061

UNITED STATES PATENT OFFICE 2,256,061

VALVE TOOL

Karl A. Tapken, Waterbury, Conn.

Application September 9, 1940, Serial No. 355,926

6 Claims. (Cl. 29—86.3)

This invention relates to valve-tools, and more particularly to valve-tools for removing the valves or valve-assemblies of Ford V8 engines.

For various reasons, it is a difficult and time-consuming operation to remove the poppet-valves from certain engines, such, for example, as the Ford V8 engine.

One object of this invention, therefore, is to provide an improved valve-tool for more quickly and easily removing valves or valve-assemblies from engines.

Another object of this invention is to provide an improved valve-tool formed of simple elements readily manufactured and readily assembled to produce a durable and efficient tool at minimum cost.

With the above and other objects in view, as will appear to those skilled in the art from the present disclosure, this invention includes all features in the said disclosure which are novel over the prior art.

In the accompanying drawings, in which one way of carrying out the invention is shown for illustrative purposes:

Fig. 1 is a diagrammatic view illustrating a first operation in connection with removal of the valve or valve-assembly;

Fig. 2 is a diagrammatic view similar to Fig. 1, of a later part of the operation of removing the valve-assembly;

Fig. 3 is a side elevation illustrating one embodiment of valve-removing tool in accordance with the invention;

Fig. 4 is an elevation from the left, of the lower portion of Fig. 3;

Fig. 5 is a vertical sectional view on line 5—5 of Fig. 4, with a portion of a valve-element;

Fig. 6 is a horizontal sectional view on line 6—6 of Fig. 5;

Fig. 7 is a vertical sectional view on line 7—7 of Fig. 6;

Fig. 8 is a vertical sectional view on line 8—8 of Fig. 6;

Fig. 9 is a horizontal sectional view on line 9—9 of Fig. 4;

Fig. 10 is a horizontal sectional view on line 10—10 of Fig. 4;

Fig. 11 is a view partly in side elevation and partly in section of the adjustable shell of the adjustable fulcrum;

Fig. 12 is a side elevation of the fulcrum-stud;

Fig. 13 is an end view of a ratchet half-member;

Fig. 14 is an underside view of Fig. 13;

Fig. 15 is a view of Fig. 14 from the right;

Fig. 16 is a view of Fig. 15 from the right;

Fig. 17 is a perspective view of the body-member;

Fig. 18 is a bottom plan view of the body-member; and

Fig. 19 is a perspective view of the angle-plate.

In the description and claims, the various parts and steps are identified by specific names for convenience, but they are intended to be as generic in their application as the prior art will permit.

Referring to the drawings, the particular fragmental portion of an engine or cylinder-block 20 illustrated in Figs. 1 and 2, represents part of a Ford V8 engine. The poppet-valve assembly, generally designated by the numeral 21, is shown mounted in the engine-block 20, and includes the valve-element 22 which has a valve-head 23 on the upper end thereof, a valve-stem 24, a limit-flange 25, and an enlarged lower end 26. A split guide or bushing 27 including two bushing-halves 28, serves as a guide to slidably support the valve-stem 24 for its operation. A valve-spring 29 engages between the bushing 27 and a valve-keeper or spring-retaining clip 30 which clip rests against the end 26, the spring 29 forcing the valve-element 22 into its closed position. The foregoing described valve-assembly is held in its position in the cylinder-block 20 by means of a bushing-retainer or retaining-clip 31 which normally seats in a counterbored recess or seat 32 and prevents the bushing 27 from being forced outwardly by the spring 29. In operation, the end 26 of the valve-element 22 is actuated by the slidably-mounted tappet or cam-plunger 33 which in turn is actuated by the cam 34 on the cam-shaft 35. The valve-head 23 is adapted to properly fit the valve-seat 36 of a valve-port 37 of the cylinder-block 20. The valve-assembly illustrated in Figs. 1 and 2 represents one valve of which there are many in the engine. The foregoing described engine and valve-construction is of usual form.

The particular embodiment of my valve-removing tool for removing the valve-assembly just previously described is generally designated by the numeral 38 and includes a body-member 39 having a forcer-head 40 to which a tubular lever 41 is pivoted by a pin 42 bearing in ears 43 of lever 41, and in which lever 41, is slidably mounted a member 44 which serves as a hammer-bar and as a lever-extension. The body-member 39 shown in perspective in Fig. 17, is preferably made as a unitary forging, although it could be made in any other desired suitable way. A fulcrum 45 is pivoted by a pin 46 to a pair of ears 47 formed integral with the lever 41.

The body-member 39 has a side-opening recess, generally designated by the numeral 48, which includes a valve-head-receiving recess-portion 49, prying-tool-receiving recess-portions 50, and a valve-stem-receiving recess-portion 51 and a valve-stem-receiving recess-portion 52. The recess-portion 51 is large enough to clear the annular shoulder or limit-flange 25 of the valve-stem, while the recess-portion 52 is of a size to freely fit the cylindrical portion 53 of the valve-stem. The valve-element 22 is capable of entering the recess 48 by a transverse movement relatively between the valve-element 22 and the body-member 39 when the head 23 of the valve-element is in the raised position indicated by broken lines in Fig. 1, so as to have the head 23 of the valve-element above the pair of locking-projections or lugs 54. Then, when the valve-head 23 moves down to have its underside engage against the lifter-seat 55, the head 23 drops down behind the locking-lugs 54 which prevents the body-member 39 from moving transversely relatively to valve-element 22, unless the valve-element is first lifted up to free the head 23 from the locking-lugs 54.

The ears 43 have oppositely-inturned limit-portions 56 adapted to engage the forcer-head 40 to limit the pivotal movement of the lever 41 in one direction, a detent, in the present instance in the form of a ball 57, being employed to yieldingly engage in a depression or socket 58 in the forcer-head 40 to yieldably lock the lever 41 in the upright position shown in Fig. 1.

The hammer bar 44 slidably mounted in the lever 41 carries a pin 59 slidable in a slot 60 in the lever 41 and adapted to engage the upper end 61 of the slot to limit the upward movement of the hammer-bar 44. The lower limit of movement of the hammer-bar 44 occurs when its lower end 62 engages the upper end of the forcer-head 40.

The pin 46 is pivoted to the stud 63 of the fulcrum 45, the shoulders 64 on opposite sides of the stud 63 serving to engage the end-faces 65 of the ears 47 to limit the swinging movement of the stud 63 in opposite directions to the approximate limits indicated by the two dotted-line positions shown in Fig. 5. The pin 66 rigidly secured to the stud 63 extends between the two ratchet-elements 67 and prevents a rotation of the elements 67 relative to the stud 63. An enlarged annular flange 68 is formed on or rigidly secured to the reduced end-portion 69 of the stud 63 and serves as a backing for a spring 70 which slidably pushes the collar 71 along the reduced portion 69 to cause the collar 71 to press the ratchet-elements 67 forward along the conical surface 72 of the stud 63 to cause the ratchet-elements 67 to spread apart or expand and bring their outer ratchet-type screw-threaded surfaces 73 into operative engagement with the internal ratchet-type screw-threads 74 of the fulcrum-sleeve 75. A wire spring 76 mounted in an annular groove 77 of the fulcrum-sleeve 75 normally tends to contract so that when the fulcrum-sleeve 75 is moved toward the right of Fig. 6 to bring the groove 77 opposite to the groove 78 of the stud 63, the spring 76 contracts and passes partly into the groove 78 to thus lock the fulcrum-sleeve 75 against further withdrawal toward the right to prevent its disassembly from the stud 63. By virtue of the ratchet-type screw-threads 73, 74, the fulcrum-sleeve 75 can be pulled to the right of Fig. 6 to lengthen the fulcrum without having to rotate the sleeve, although, if desired, such lengthening can be accomplished by rotating the sleeve 75. When it is desired to shorten the fulcrum, this can be accomplished by rotating the sleeve 75 in the opposite direction, but not by mere sliding of the sleeve 75.

The thinness of the body-member 39 in the region of the recess 51 is such as to incidentally form a hole 85, the thinness being provided in order to provide sufficient clearance to pass the lower portion of the body-member 39 between the valve-head 23 and its seat 36 in the operation of removing the valve-assembly. The lower end or pusher-end 82 of the body-member 39 has a diameter small enough to just easily permit the end 82 to extend freely into the upper portion of the passage 86 in the engine block 20 and thus bring the recess 52 properly centered relatively to the valve-stem 24. The pusher-end 82 has a pair of sharp spaced-apart inner edge-portions 87 adapted to engage against the machined flat upper central surface portion of the bushing 27, and a pair of sharp outer edge-portions 88 extending from the portions 87 to the opposite sides of the pusher-end 82 and which portions 88 normally clear the bushing 27 but engage the upper surface of the bushing 27 if for any reason the portions 87 slip from their proper position during removal of the valve-assembly. If such slippage occurs, the surface 52 swings back away from the cylindrical portion 53 of the valve-stem 24, with the consequence that the outer sharp edge portions 88 swing downward due to their location nearer the plane of front face 89 of the body-member 39 than the inner sharp edge-portions 87.

In order to prevent the fulcrum 45 from slipping off the edge of the engine-block 20, an angle-plate 90 (Figs. 1, 2 and 19) may be employed. The angle-plate 90 has a plurality of holes 91 adapted to slip over the studs 92 of the engine-block 20 to anchor the angle-plate 90 in position as shown in Figs. 1 and 2, and has an upstanding flange 93 against which the fulcrum 45 can engage to prevent the latter from slipping off the edge of the engine-block 20. The angle-plate 90 can also have a slot 94 in its end 95 to aid in releasing the valve-keeper or spring-retaining clip 30 from the valve-assembly by clamping the angle-plate in a vise, pressing the valve-assembly sidewise against the end 95 of the plate 90 having the slot 94 to bring the end 95 between the coils of the valve-spring 29 adjacent the keeper 30, and then pushing against the valve-head 23 to free the keeper 30 from the pressure of the spring 29, so that the keeper 30 can then be readily removed.

In using the tool to remove a valve-assembly, such, for example, as a Ford V8 valve-assembly illustrated in Figs. 1 and 2, the cam-shaft 35 is rotated to a position to force the tappet 33 to push the valve-element 22 upwardly to partly raise the valve-head 23 above its seat 36, thus affording access beneath the head 23 by any suitable prying tool such, for example, as the claw-like tool 79 shown by broken lines in Fig. 1, which has its hand-end 80 pressed down sufficiently to raise the claw-end 81 and the valve-head 23 to an adequately-high position. Thereupon, the valve-removing tool 38, having the lever 41 arranged relatively to the body-member 39 as shown in Fig. 1, is placed in the position indicated by broken lines in Fig. 1 to permit the reduced lower pusher-end 82 to be slid obliquely downwardly between the valve-seat 36 and the valve-head 23 with part of the valve-stem 24 extending into the lower end of the recess-portion 52. As the tool 38 is pushed further into the valve-port 37, it is rocked or swung toward the position illustrated in full lines in Fig. 1, and during this transverse rocking and endwise movement of the tool 38 into the valve-port 37, the clearance-chamfers 83 permit the lower-end or pusher-portion 82 of the body-member 39 to pass along between the flange 25 and the wall of the valve-port 37 to bring the tool 38 toward the position shown in Fig. 1. When the tool 38 is near this position of insertion, there is then sufficient freedom of the lower-end portion 82 of the body-member 39 in the port 37 to permit the flange 25 to pass outside and above the locking-lugs 54, whereupon the tool 38 can be swung transversely to bring it into the exact position shown in Fig. 1, to thus cause the valve-element 22 to move into the recess 48, as shown by the dotted-line position of valve-head 23 in Fig. 1. During this transverse and endwise movement of the tool 38 to the position shown in Fig. 1, the claw-ends 81 of the prying-tool 79 are received in the recess-portions 50. By removing the prying-tool 79, the valve-spring 29 is permitted to pull the valve-head 23 down to the full-line position of the valve-head 23 shown in Figs. 1 and 5, to thus seat the head 23 on the lifter-seat 55. When the tool 38 has been thus moved to the position shown in Fig. 1, the valve-element 22 will then be in the recess 48 in the position shown in Figs. 1 and 5, with the limit-flange 25 located behind the two locking-lugs 54 which thus prevent any transverse or outward movement of the valve-element 22.

The hammer-element 44 is now drawn out or extended and then moved quickly in to cause its lower end 62 to strike a blow against the forcer-head 40 of the body-member 39, to cause the pusher-end 82 at the lower end of the body-member 39 to strike a blow against the split bushing 27 and force the valve-assembly 21 downwardly through the passage 86 in which it is frictionally seated, to thus move the bushing 27 to a position illustrated in Fig. 2, whereupon the bushing-retainer 31 (Fig. 1) can be readily removed from its position in the groove 84 of the bushing 27.

The lever 41 is now swung to a position such as illustrated in Fig. 2, to bring the fulcrum 45 into engagement with a surface of the cylinder-block 20, or against the angle-plate 90 and its flange 93 where the angle-plate 90 is employed, whereupon pressure is exerted on the lever 41 or the hammer-bar or lever-extension 44 to thus partly force or raise the valve-assembly axially out of the port 37 in which it is located. In order to at all times maintain the valve-element 22 in substantial alignment with its proper position in the bushing 27 and avoid distorting or bending the valve-element 22, the valve-assembly is only moved a relatively-short distance at one movement of the lever 41, the fulcrum 45 being adjusted to successively longer and longer lengths, between which adjustment another pry is taken on the lever 41 or its extension 44, to thus further pull the valve-assembly out of its location in the cylinder-block. After removing the valve-assembly from the cylinder-block, each of the other valve-assemblies is removed from the cylinder-block in a similar manner.

The invention may be carried out in other specific ways than that herein set forth without departing from the spirit and essential characteristics of the invention, and the present embodiment is, therefore, to be considered in all respects as illustrative and not restictive, and all changes coming within the meaning and equivalency range of the appended claims are intended to be embraced therein.

I claim:

1. A tool for a valve including a valve-element having a valve-head and a valve-stem, a bushing, a spring and a bushing-retainer, comprising: a body-member having a side-opening head and stem recess forming a structure to partially surround the head and stem of a valve-element; said recess being of such height as to allow longitudinal movement of the valve-element in the recess and being provided with a seat adapted to engage an upper portion of the valve-element when it is moved relatively longitudinally downwardly in the recess, and said recess being adapted to permit an upper portion of said valve-element to move transversely relatively to said body-member to admit the valve-element into the recess of said body-member and allow the valve-element to move longitudinally down to a seated position in said recess; and locking-means becoming operative when said valve-element is seated in said recess and adapted to lock said valve-element against transverse movement out of said recess from said seated position, but permitting a longitudinal upward movement followed by a transverse movement out of said recess; said body-member being adapted to be moved transversely and endwise partly into a valve-port and receive said upper portion of said valve-element in said recess while said valve-head is held raised by a tool.

2. A tool for a valve including a valve-element having a valve-head and a valve-stem, a bushing, a spring and a bushing-retainer, comprising: a body-member having a pusher-end, a side-opening head and stem recess forming a structure to partially surround the head and stem of a valve-element; said recess being of such height as to allow longitudinal movement of the valve-element in the recess and being provided with a seat adapted to engage an upper portion of the valve-element when it is moved relatively longitudinally downwardly in the recess, and said recess being adapted to permit an upper portion of said valve-element to move transversely relatively to said body-member to admit the valve-element into the recess of said body-member and allow the valve-element to move longitudinally down to a seated position in said recess; and locking-means permanently fixed to and rigid with said body-member and becoming operative when said valve-element is seated in said recess and adapted to lock said valve-element against transverse movement out of said recess from said seated position, but permitting a longitudinal upward movement followed by a transverse movement out of said recess; said body-member being adapted to be moved transversely and endwise partly into a valve-port and receive said upper portion of said valve-element in said recess and bring said pusher-end into engagement with said bushing while said valve-head is held raised by a tool.

3. A tool for a valve including a valve-element having a valve-head and a valve-stem, a bushing, a spring and a bushing-retainer, comprising: a body-member having a side-opening head and stem recess forming a structure to partially surround the head and stem of a valve-element; said recess being of such height as to allow longitudinal movement of the valve-element in the recess and being provided with a seat adapted to engage an upper portion of the valve-element when it is moved relatively longitudinally downwardly in the recess, and said recess being adapted to permit an upper portion of said valve-element to move transversely relatively to said body-member to admit the valve-element into the recess of said body-member and allow the valve-element to move longitudinally down to a seated position in said recess; and locking-means becoming operative when said valve-element is seated in said recess and adapted to lock said valve-element against transverse movement out of said recess from said seated position, but permitting a longitudinal upward movement followed by a transverse movement out of said recess; said body-member being adapted to be moved transversely and endwise partly into a valve-port and receive said upper portion of said valve-element in said recess while said valve-head is held raised by a tool; and a lever pivoted to said body-member.

4. A tool for a valve including a valve-element having a valve-head and a valve-stem, a bushing, a spring and a bushing-retainer, comprising: a body-member having a side-opening head and stem recess forming a structure to partially surround the head and stem of a valve-element; said recess being of such height as to allow longitudinal movement of the valve-element in the recess and being provided with a seat adapted to engage an upper portion of the valve-element when it is moved relatively longitudinally downwardly in the recess, and said recess being adapted to permit an upper portion of said valve-element to move transversely relatively to said body-member to admit the valve-element into the recess of said body-member and allow the valve-element to move longitudinally down to a seated position in said recess; and locking-means becoming operative when said valve-element is seated in said recess and adapted to lock said valve-element against transverse movement out of said recess from said seated position, but permitting a longitudinal upward movement followed by a transverse movement out of said recess; said body-member being adapted to be moved transversely and endwise partly into a valve-port and receive said upper portion of said valve-element in said recess while said valve-head is held raised by a tool; a lever pivoted to said body-member; and an adjustable-length fulcrum extending transversely from said lever.

5. A tool for a valve including a valve-element having a valve-head and a valve-stem, a bushing, a spring and a bushing-retainer, comprising: a body-member having a side-opening head and stem recess forming a structure to partially surround the head and stem of a valve-element; said recess being of such height as to allow longitudinal movement of the valve-element in the recess and being provided with a seat adapted to engage an upper portion of the valve-element when it is moved relatively longitudinally downwardly in the recess, and said recess being adapted to permit an upper portion of said valve-element to move transversely relatively to said body-member to admit the valve-element into the recess of said body-member and allow the valve-element to move longitudinally down to a seated position in said recess; and locking-means becoming operative when said valve-element is seated in said recess and adapted to lock said valve-element against transverse movement out of said recess from said seated position, but permitting a longitudinal upward movement followed by a transverse movement out of said recess; said body-member being adapted to be moved transversely and endwise partly into a valve-port and receive said upper portion of said valve-element in said recess while said valve-head is held raised by a tool; a lever pivoted to said body-member; and an adjustable-length fulcrum pivoted to said lever.

6. A tool for a valve including a valve-element having a valve-head and a valve-stem, a bushing, a spring and a bushing-retainer, comprising: a body-member having a side-opening head and stem recess forming a structure to partially surround the head and stem of a valve-element; said recess being of such height as to allow longitudinal movement of the valve-element in the recess and being provided with a seat adapted to engage an upper portion of the valve-element when it is moved relatively longitudinally downwardly in the recess, and said recess being adapted to permit an upper portion of said valve-element to move transversely relatively to said body-member to admit the valve-element into the recess of said body-member and allow the valve-element to move longitudinally down to a seated position in said recess; and locking-means becoming operative when said valve-element is seated in said recess and adapted to lock said valve-element against transverse movement out of said recess from said seated position, but permitting a longitudinal upward movement followed by a transverse movement out of said recess; said body-member being adapted to be moved transversely and endwise partly into a valve-port and receive said upper portion of said valve-element in said recess while said valve-head is held raised by a tool; a lever pivoted to said body-member; a fulcrum extending transversely from said lever; and fulcrum anchor-means having means adapted to detachably anchor the anchor-means to an engine-block and having abutment-means adapted to be engaged by said fulcrum.

KARL A. TAPKEN.